(12) United States Patent
Saito et al.

(10) Patent No.: US 7,654,360 B2
(45) Date of Patent: Feb. 2, 2010

(54) MOTOR-DRIVEN STEERING APPARATUS

(75) Inventors: Mitsuo Saito, Tochigi (JP); Isamu Arai, Tochigi (JP)

(73) Assignee: Showa Corporation, Saitama (JP)

( * ) Notice: Subject to any disclaimer, the term of this patent is extended or adjusted under 35 U.S.C. 154(b) by 195 days.

(21) Appl. No.: 11/520,875

(22) Filed: Sep. 14, 2006

(65) Prior Publication Data

US 2007/0175696 A1    Aug. 2, 2007

(30) Foreign Application Priority Data

Jan. 27, 2006    (JP)    ............................. 2006-019829

(51) Int. Cl.
B62D 15/02    (2006.01)
(52) U.S. Cl. .................................................. 180/444
(58) Field of Classification Search .................. 180/444
See application file for complete search history.

(56) References Cited

U.S. PATENT DOCUMENTS

| | | | | |
|---|---|---|---|---|
| 4,657,103 A | * | 4/1987 | Shimizu | ...................... 180/446 |
| 5,447,143 A | * | 9/1995 | Ott et al. | ...................... 123/612 |
| 5,941,131 A | | 8/1999 | Foehl | |
| 5,979,248 A | * | 11/1999 | Gloger | ...................... 73/862.28 |
| 6,477,899 B2 | * | 11/2002 | Weiss et al. | ...................... 73/579 |
| 6,655,187 B1 | * | 12/2003 | Lehner et al. | ................. 73/1.75 |
| 6,966,399 B2 | * | 11/2005 | Tanigaki et al. | .............. 180/444 |
| 7,350,617 B2 | * | 4/2008 | Lausser et al. | ............... 180/444 |
| 7,360,457 B2 | * | 4/2008 | Chikaraishi | ............ 73/862.322 |
| 7,370,517 B2 | * | 5/2008 | Rupp et al. | ............... 73/114.04 |
| 2004/0060766 A1 | * | 4/2004 | Hayakawa et al. | ........... 180/444 |
| 2004/0248664 A1 | * | 12/2004 | Billings | ...................... 473/300 |
| 2007/0051189 A1 | * | 3/2007 | Nakatani | ............... 73/862.333 |

FOREIGN PATENT DOCUMENTS

| | | |
|---|---|---|
| JP | 2004-231011 | 8/2004 |
| JP | 2005-23949 | 1/2005 |

* cited by examiner

*Primary Examiner*—Tony H. Winner
(74) *Attorney, Agent, or Firm*—Orum & Roth LLC

(57) ABSTRACT

In a motor-driven steering apparatus structured such that a motor-driven steering assist unit is interposed between a steering shaft in a handle side and a wheel side steering member, and an input shaft connected to the steering shaft of the motor-driven steering assist unit and an output shaft connected to the wheel side steering member are coupled by a torsion bar and arranged on the same center axis, reference angle position marks are applied to portions existing at the same angle position around the same center axis of the input shaft and the output shaft, in a neutral steering state in which a steering force is not applied to the input shaft of the motor-driven steering assist unit.

14 Claims, 4 Drawing Sheets

MOTOR-DRIVEN STEERING APPARATUS

BACKGROUND OF THE INVENTION

1. Field of the Invention

The present invention relates to a motor-driven steering apparatus.

2. Description of the Related Art

For a motor-driven steering apparatus for a saddle riding type vehicle such as a buggy vehicle or the like, there has been a structure in which a motor-driven steering assist unit is interposed between a steering shaft of a handle side and a wheel side steering member, as described in Japanese Patent Application Laid-open No. 2004-231011 (patent document 1). The structure is made such that a steering force applied to the handle by a driver is assisted by a generated torque of an electric motor.

A conventional motor-driven steering apparatus is structured such that a steering shaft in a handle side is attached to a position at a proper mounting angle with respect to an input shaft of a motor-driven steering assist unit, a wheel side steering member is attached to a position of a proper mounting angle with respect to an output shaft, and a motor-driven steering assist unit is thereafter attached to a vehicle body frame. At this time, if the mounting position of the motor-driven steering assist unit with respect to the vehicle body frame is deviated, a torsion bar coupling an input shaft and an output shaft of the motor-driven steering assist unit is ineffectively twisted, and it is impossible to set the mounting position of the handle to a proper neutral position.

However, in the prior art, the mounting position of the motor-driven steering assist unit with respect to the vehicle body frame is shifted from a correct position at a mounting state of the motor-driven steering assist unit to the vehicle body frame, and it is impossible to easily discriminate whether or not the torsion bar coupling the input shaft and the output shaft of the motor-driven steering assist unit is twisted ineffectively. Even if it is found after an assembly of the vehicle is finished that the actual mounting position of the handle is deviated from the proper neutral position, it is hard to correct the deviation because of the other auxiliary machines attached to the vehicle body frame.

SUMMARY OF THE INVENTION

An object of the present invention is to easily discriminate whether or not a mounting position of a motor-driven steering assist unit with respect to a vehicle body frame is deviated from a correct position in a mounting stage of the motor-driven steering assist unit to the vehicle frame, and a torsion bar coupling an input shaft and an output shaft of the motor-driven steering assist unit is twisted ineffectively.

The present invention relates to a motor-driven steering apparatus structured such that a motor-driven steering assist unit is interposed between a steering shaft in a handle side and a wheel side steering member, and an input shaft connected to the steering shaft of the motor-driven steering assist unit and an output shaft connected to the wheel side steering member are coupled by a torsion bar and arranged on the same center axis. Reference angle position marks are applied to portions existing at the same angle position around the same center axis of the input shaft and the output shaft, in a neutral steering state in which a steering force is not applied to the input shaft of the motor-driven steering assist unit.

BRIEF DESCRIPTION OF THE DRAWINGS

The present invention will be more fully understood from the detailed description given below and from the accompanying drawings which should not be taken to be a limitation on the invention, but are for explanation and understanding only.

The drawings.

DESCRIPTION OF THE PREFERRED EMBODIMENTS

Figure 1:
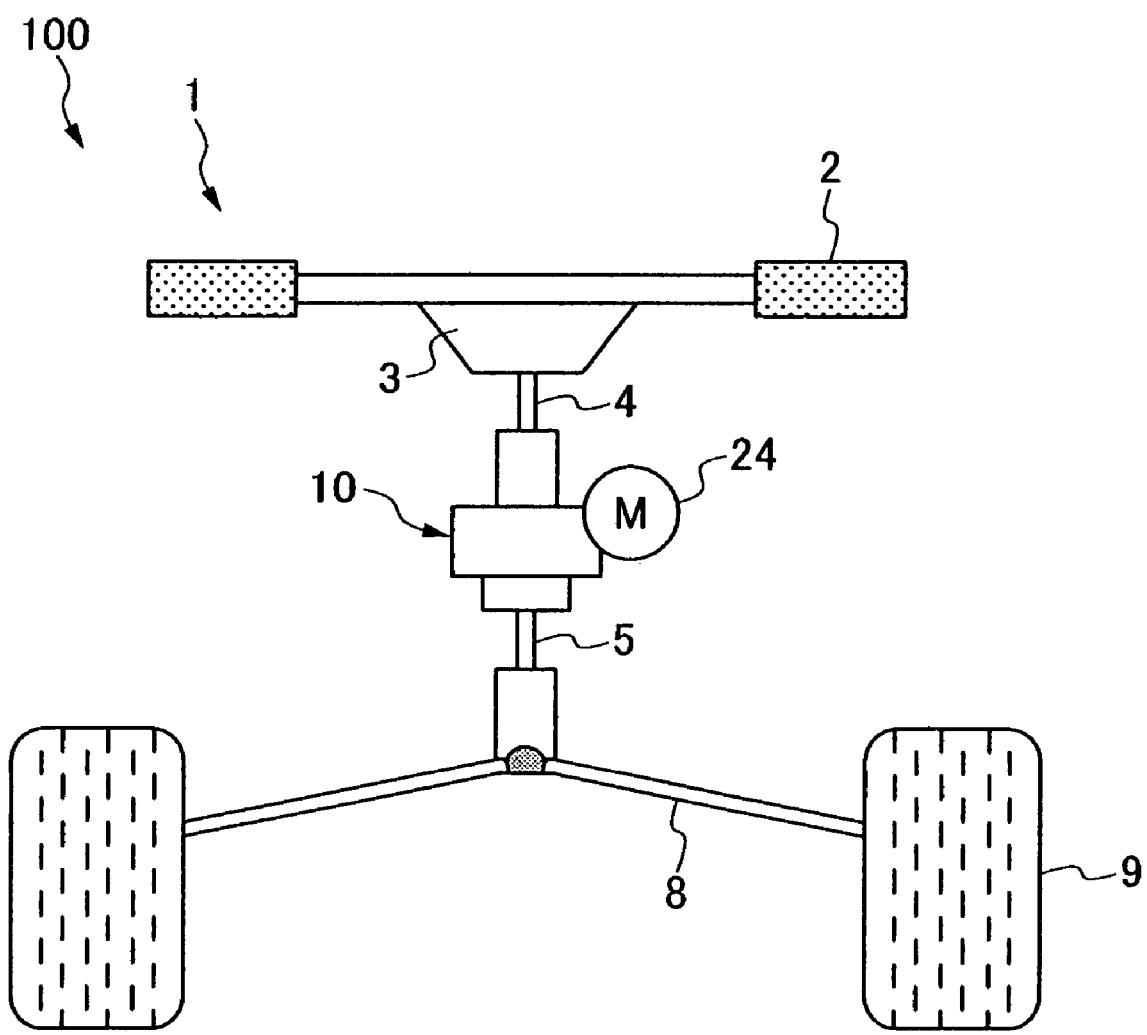
FIG. 1 is a schematic view showing a saddle riding type vehicle.

A saddle riding type vehicle 100 in FIG. 1 is used as a rough road traveling vehicle such as a four-wheeler, buggy vehicle, snowmobile or the like, and has a motor-driven steering apparatus 1. The motor-driven steering apparatus 1 is structured such that a handle stay 3 provided with a bar handle 2 serving as a steering handle is fixed to a steering shaft 4 in the manner mentioned below, and a motor-driven steering assist unit 10 is interposed between the steering shaft 4 and a tire wheel side steering member 5.

Figure 2:
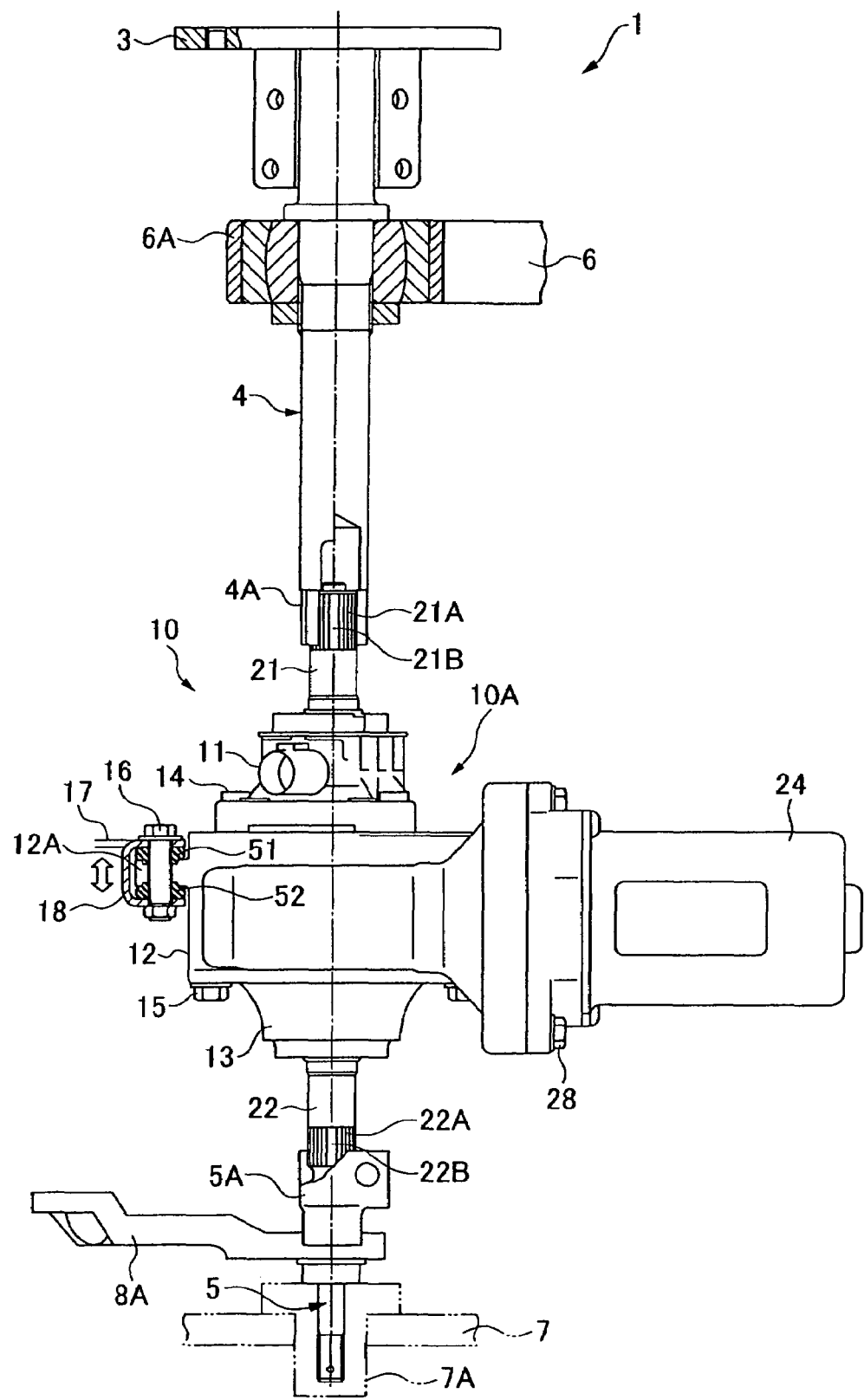
FIG. 2 is a schematic view showing a motor-driven steering apparatus.

The motor-driven steering apparatus 1 is structured, as shown in FIG. 2, such that the steering shaft 4 is rotatably supported to a support member 6A of an upper vehicle body side stay 6 via a bearing. The tire wheel side steering member 5 is rotatably supported to a support member 7A of a lower vehicle body side stay 7 via a bearing, and a pitman arm 8A is fixed to an intermediate portion thereof. The pitman arm 8A is coupled to right and left front wheels 9 via right and left tie rods 8. The upper and lower vehicle body side stays 6 and 7 are supported to a vehicle body frame.

Figure 3:
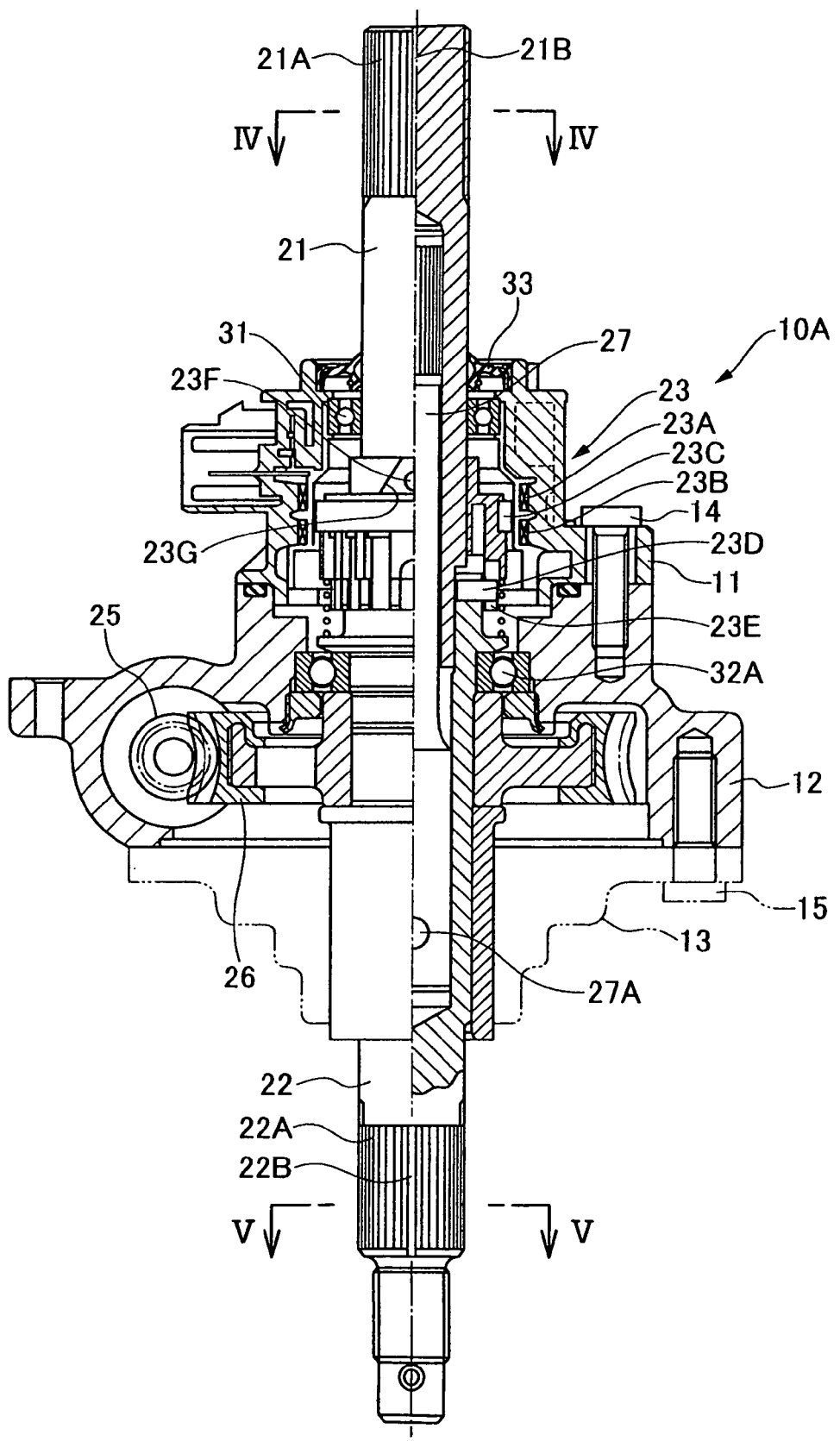
FIG. 3 is a schematic view showing a motor-driven steering assist unit.

The motor-driven steering assist unit 10 is structured by a single unit body 10A covered by first housing 11 (upper housing or upper cover), second housing (main housing), and third housing (lower housing or lower cover) 13, as shown in FIGS. 2 and 3. The unit body 10A has an input shaft 21, an output shaft 22, a torque sensor 23, an electric motor 24, a worm gear 25 and a worm wheel 26 built-in.

The motor-driven steering assist unit 10 is structured such that an upper end portion of the input shaft 21 to which the steering shaft 4 is connected by a connecting device 4A is supported to the first housing 11 (FIG. 3) by the bearing 31. Upper and lower end portions of the output shaft 22 to which the tire wheel side steering member 5 is connected by a connecting device 5A are supported to the second housing 12 and the third housing 13 by upper and lower bearings 32A and 32B (not shown). The input shaft 21 is provided with a serration 21A for connection to the connecting device 4A in an upper end outer peripheral portion. The output shaft 22 is provided with a serration 22A for connecting to the connecting device 5A in a lower end outer peripheral portion. A torsion bar 27 is inserted to a hollow portion of the input shaft 21. One end of the torsion bar 27 is coupled to the input shaft 21 by serration, and the other end of the torsion bar 27 is inserted in a hollow portion of the output shaft 22 so as to be connected by a coupling pin 27A. The motor-driven steering assist unit 10 is structured such that the input shaft 21 connected to the steering shaft 4 and the output shaft 22 connected to the wheel side steering member 5 are coupled by the torsion bar 27 so as to be coaxially arranged.

A torque sensor 23 is provided with two detecting coils 23A and 23B surrounding a cylindrical core 23C engaged with the input shaft 21 and the output shaft 22, in the first housing 11, as shown in FIG. 3. The core 23C is provided with a vertical groove 23E engaging with a guide pin 23D of the output shaft 22 so as to be movable only in an axial direction, and is provided with a spiral groove 23G engaging with a slider pin 23F of the input shaft 21. Accordingly, when a steering torque applied to the steering wheel is applied to the input shaft 21, and a relative displacement in a rotation direction is generated between the input shaft 21 and the output shaft 22 on the basis of an elastic torsional deformation of the torsion bar 27, the displacement in the rotation direction of the input shaft 21 and the output shaft 22 displaces the core 23C in an axial direction. An inductance of the detecting coils 23A and 23B caused by a magnetic change around the detecting coils 23A and 23B due to the displacement of the core 23C is changed. In other words, when the core 23C moves close to the input shaft 21, the inductance of the detecting coil 23A to which the core 23C moves close is increased, and the inductance of the detecting coil 23B from which the core 23C moves apart is reduced, whereby it is possible to detect the steering torque on the basis of the change of the inductance.

The electric motor 24 is attached and supported to the second housing 12 by a mounting bolt 28, and is driven by a controller (not shown) in correspondence to the detected torque of the torque sensor 23. A worm gear 25 is coupled to a rotation shaft of the electric motor 24 by a joint, and the worm wheel 26 engaging with the worm gear 25 is fixed to the output shaft 22. The worm gear 25 is supported at both ends to the second housing 12 by right and left bearings (not shown). The worm wheel 26 is fixed to the output shaft 22 just below an upper bearing 32A in the output shaft 22, in an inner portion of the second housing 12.

Accordingly, in the motor-driven steering assist unit 10, an integral unit body 10A is structured by supporting the upper end portion of the input shaft 21 and the torque sensor 23 to the first housing 11. The upper end portion of the output shaft 22, the electric motor 24, the worm gear 25 and the worm wheel 26 are supported by the second housing 12. The lower end portion of the output shaft 22 is supported by the third housing 13. The first housing 11 and the second housing 12 are coupled by the mounting bolt 14, and the second housing 12 and the third housing 13 are coupled by the mounting bolt 15. An oil seal 33 is attached in a sealing manner to an upper opening portion of the bearing 31 in the first housing 11, and an oil seal 34 is attached in a sealing manner to a lower opening portion of the bearing 32B in the third housing 13.

Further, the motor-driven steering assist unit 10 is structured such that the second housing 12 can be attached to the vehicle body side. The motor-driven steering assist unit 10 is structured, as shown in FIG. 2, such that elastic members 51 and 52 such as a rubber bush or the like are provided in both sides of attaching bosses 12A provided at a plurality of positions, for example, three positions, in a peripheral direction of an outer periphery of the second housing 12. The attaching bosses 12A are pinched between upper and lower support pieces of forked support portions 18 provided at a plurality of positions corresponding to the attaching bosses 12A of the vehicle body side attaching stay 17 via the elastic members 51 and 52. The attaching boss 12A is pinched in a floating fixed state between the upper and lower support pieces via the elastic members 51 and 52 by the support pieces of the forked support portion 18, the elastic members 51 and 52, and an attaching bolt 16 (a nut) inserted and attached to a bolt hole provided in each of the attaching bosses 12A. The vehicle body side bracket 17 is supported to the vehicle body frame.

In the motor-driven steering apparatus 1, the steering torque applied to the bar handle 2 is detected by the torque sensor 23, the electric motor 24 is driven on the basis of the detected torque, and the torque generated by the electric motor 24 is transmitted to the output shaft 22 via the worm gear 25 and the worm wheel 26. Accordingly, the torque generated by the electric motor 24 can be used as an assist force for the steering force which the driver applies to the bar handle 2.

Figure 4:
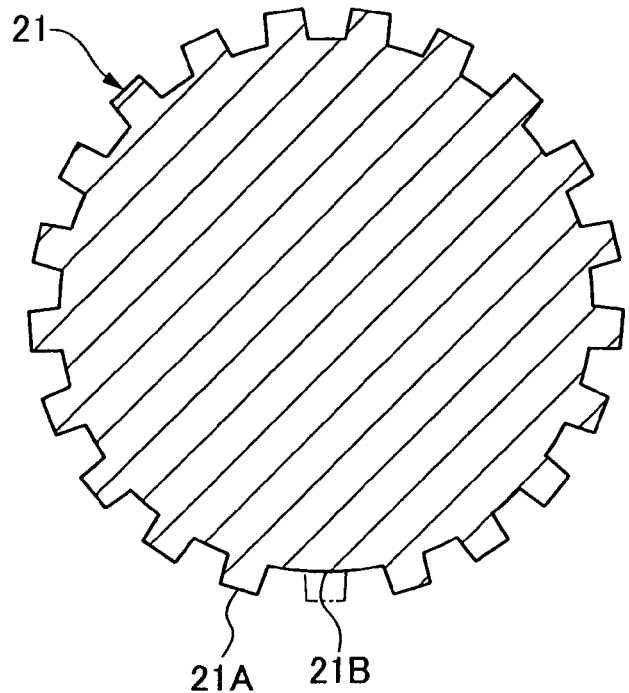
FIG. 4 is a cross sectional view along a line IV-IV in FIG. 3.
Figure 5:
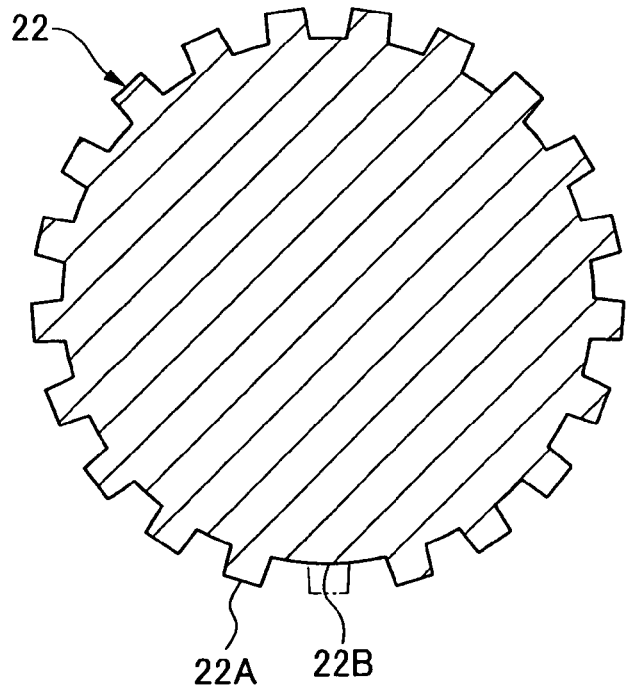
FIG. 5 is a cross sectional view along a line V-V in FIG. 3.

Accordingly, in the motor-driven steering apparatus 1, as shown in FIG. 3, reference angle marks 21B and 22B are applied to portions at the same angular positions around the same center axis of the input shaft 21 and the output shaft 22, in a neutral steering state (a free state) in which the steering force is not applied to the input shaft 21 of the motor-driven steering assist unit 10. The reference angle position mark 21B of the input shaft 21 corresponds to one differentiated or snaggly tooth portion formed in the serration 21A of the input shaft 21, as shown in FIG. 4. The reference angle position mark 22B of the output shaft 22 corresponds to one differentiated or snaggly tooth portion formed in the serration 22A of the output shaft 22, as shown in FIG. 5. In a front view of the neutral steering state (the free state) shown in FIG. 3 of the motor-driven steeling assist unit 10, the reference angle position mark 21B of the input shaft 21 and the reference angle position mark 22B of the output shaft 22 are positioned on the same line along the same center axis of the input shaft 21 and the output shaft 22.

A description will be given below of a mounting procedure of the motor-driven steering apparatus 1.

(1) The steering shaft 4 in the handle 2 side is attached to the proper mounting angle position with respect to the input shaft 21 of the motor-driven steering assist unit 10. The wheel side steering member 5 is attached to the proper mounting angle position with respect to the output shaft 22 of the motor-driven steering assist unit 10. At this time, the motor-driven steering apparatus 1 can position the steering shaft 4, and the bar handle 2 by extension to the proper neutral position.

(2) The motor-driven steering apparatus 1 mentioned above (1) is attached to the vehicle body frame (the upper end lower vehicle body side stays 6 and 7, and the vehicle body side bracket 17). In other words, the steering shaft 4 is attached to the upper vehicle body side stay 6, the wheel side steering member 5 is attached to the lower vehicle body side stay 7, and the motor-driven steering assist unit 10 is attached to the vehicle body side bracket 17.

(3) In the mounting stage of the motor-driven steering apparatus 1 mentioned above (2) to the vehicle body frame, the reference angle position mark 21B of the input shaft 21 and the reference angle position mark 22B of the output shaft 22 are set such that their angle positions are identical with each other around the same center axis. It is checked on the basis of a visual observation by a worker or a measured result by a measuring device.

Therefore, in accordance with the present embodiment, the following operations and effects can be obtained.

(a) In the neutral steering state in which the steering force is not applied to the input shaft 21 of the motor-driven steering assist unit 10, the reference angle position marks 21B and 22B are attached to the positions existing at the same angle position around the same center axis of the input shaft 21 and the output shaft 22. Accordingly, it may be recognized on the basis of the visual observation by the worker or the measured result by the measuring device that the reference angle position mark 21B of the input shaft 21 and the reference angle position mark 22B are different from each other in their angle positions around the same center axis. This may occur in the stage in which the steering shaft 4 in the bar handle 2 side is attached to the proper mounting angle position with respect to the input shaft 21 of the motor-driven steering assist unit 10, the wheel side steering member 5 is attached to the proper mounting angle position with respect to the output shaft 22, and the motor-driven steering assist unit 10 is thereafter attached to the vehicle body frame. It is possible to discriminate that an inadequacy exists in the mounted state of the motor-driven steering assist unit 10 to the vehicle body frame, and an application of an unnecessary external force exists between the input shaft 21 and the output shaft 22. In other words, it may be determined that the mounted position of the motor-driven steering assist unit 10 to the vehicle body frame is deviated from the correct position. In the case mentioned above, it is possible to immediately correct the deviation of the mounted position of the motor-driven steering assist unit 10 to the vehicle body frame in its mounting stage. In accordance with this structure, it is possible to set the actual mounted position of the bar handle 2 to the proper neutral position in the stage in which the assembly of the vehicle is finished.

(b) It is possible to easily form the reference angle position mark 21B of the input shaft 21 and the reference angle position mark 22B of the output shaft 22 mentioned in the item (a) by the differentiated or snaggly tooth portions formed in the serrations 21A and 22A.

(c) The laterally extending length of the bar handle 2 is long. Accordingly, when the mounted position of the motor-driven steering assist unit 10 to the vehicle body frame is deviated from the correct position, and the torsion bar coupling the input shaft 21 and the output shaft 22 of the motor-driven steering assist unit 10 is twisted ineffectively, the deviation of the mounted position of the bar handle 2 from the correct neutral position is enlarged by both end grip portions so as to be distinguished. In the present invention, it is possible to set the actual mounted position of the bar handle 2 to the proper neutral position.

(d) In the saddle riding type vehicle 100, it is possible to advantageously achieve the items (a) to (c) mentioned above.

As heretofore explained, embodiments of the present invention have been described in detail with reference to the drawings. However, the specific configurations of the present invention are not limited to the illustrated embodiments but those having a modification of the design within the range of the presently claimed invention are also included in the present invention. For example, in the present invention, the reference angle position mark of the input shaft and the reference angle position mark of the output shaft may be constituted by a paint mark, an engraved mark or the like.

Although the invention has been illustrated and described with respect to several exemplary embodiments thereof, it should be understood by those skilled in the art that the foregoing and various other changes, omissions and additions may be made to the present invention without departing from the spirit and scope thereof. Therefore, the present invention should not be understood as limited to the specific embodiment set out above, but should be understood to include all possible embodiments which can be encompassed within a scope of equivalents thereof with respect to the features set out in the appended claims.

What is claimed is:

1. A motor-driven steering apparatus comprising a motor-driven steering assist unit is interposed between a steering shaft in a handle side and a wheel side steering member, and an input shaft connected to the steering shaft of the motor-driven steering assist unit and an output shaft connected to the wheel side steering member are coupled by a rotatably elastically deformable torsion bar and are arranged on the same center axis, wherein reference angle position marks are applied to portions existing at the same angle position around and linearly aligned with the same center axis of the input shaft and the output shaft, which are aligned only in a neutral steering state in which an external force is not applied to the input shaft of the motor-driven steering assist unit, and are misaligned when an external force is applied to the input shaft.

2. A motor-driven steering apparatus as claimed in claim 1, wherein the reference angle position mark provided in the input shaft of the motor-driven steering assist unit comprises one differentiated tooth portion formed in a serration of the input shaft, and the reference angle position mark provided in the output shaft of the motor-driven steering assist unit comprises one differentiated tooth portion formed in a serration of the output shaft.

3. A motor-driven steering apparatus as claimed in claim 1, wherein the handle comprises a bar handle.

4. A motor-driven steering apparatus as claimed in claim 2, wherein the handle comprises a bar handle.

5. A motor-driven steering apparatus as claimed in claim 1, wherein the reference angle position marks comprise paint marks respectively provided in the input shaft and the output shaft of the motor-driven steering assist unit.

6. A motor-driven steering apparatus as claimed in claim 1, wherein the reference angle position marks comprise engraved marks respectively provided in the input shaft and the output shaft of the motor-driven steering assist unit.

7. A saddle riding vehicle using the motor-driven steering assist apparatus as claimed in claim 1.

8. A saddle riding vehicle using the motor-driven steering assist apparatus as claimed in claim 2.

9. A saddle riding vehicle using the motor-driven steering assist apparatus as claimed in claim 3.

10. A saddle riding vehicle using the motor-driven steering assist apparatus as claimed in claim 4.

11. A saddle riding vehicle using the motor-driven steering assist apparatus as claimed in claim 5.

12. A saddle riding vehicle using the motor-driven steering assist apparatus as claimed in claim 6.

13. A motor-driven steering apparatus as claimed in claim 2, wherein said differentiated tooth portions being relieved sections of the respective tooth portions.

14. A motor-driven steering apparatus as claimed in claim 13, wherein the reference angle position marks are reuseable during re-assembly of the input and output shafts.

* * * * *